April 11, 1939. H. K. REINOEHL ET AL 2,154,011
AUTOMOTIVE VEHICLE
Filed Dec. 24, 1936   6 Sheets-Sheet 1

Fig. 4.

Patented Apr. 11, 1939

2,154,011

UNITED STATES PATENT OFFICE 2,154,011

AUTOMOTIVE VEHICLE

Harry K. Reinoehl and Donald G. Renno, Fort Wayne, Ind., assignors to International Harvester Company, a corporation of New Jersey Application December 24, 1936, Serial No. 117,450

10 Claims. (Cl. 180—54)

This invention relates to motor vehicles. More specifically it relates to a particular type of motor vehicle which has been designated, due to its construction, as a cab-over-engine type.

Due to the increasing restriction on the length of motor trucks, particularly because of heavy traffic conditions, a number of designs have been developed to increase the pay-load over that of the conventional type of truck, in which the engine is mounted beneath the hood in front of the cab or driver's seat.

The principal object of the present invention is an improved truck design in which the driver's seat is mounted directly over an engine positioned longitudinally, very similar to the conventional engine location.

Another object is to provide a construction in which the engine and the radiator therefor are located to provide a foot compartment for the driver.

Another object is to provide an improved engine ventilating system for use in a truck of the cab-over-engine type.

Another object is to provide a construction in which the engine and accessories therefor are available for maintenance and repair.

The above objects and others, which will be apparent from the detailed description to follow, are accomplished by a novel truck design and arrangement of parts as shown in the drawings, in which.

Only the forward end of a truck has been shown in the drawings, it being understood that the rear end of the frame and the driving wheels are conventional in construction. The frame consists of side frame members 10 connected together by cross members, three of which are shown, at the forward end of the frame. The front cross frame member 11 supports some of the controls, as will be hereinafter described. The cross member 12 supports the front end of the engine assembly. The cross member 13 supports the rear end of the engine and transmission assembly. These cross members are channel-shaped with lateral flanges to provide a rigid cross section.

Figure 4:
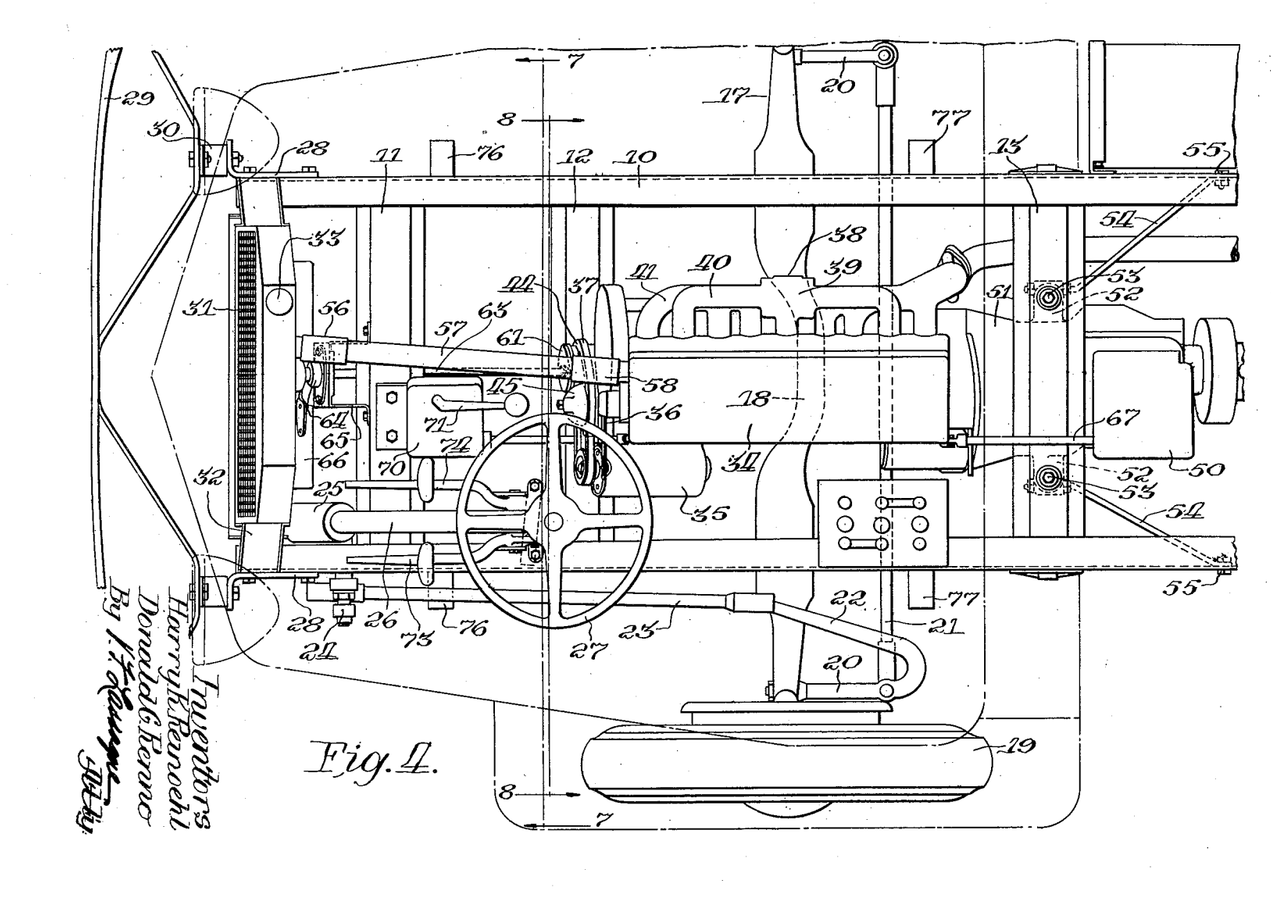
Figure 4 is a top plan view of the chassis utilized in the truck shown in Figure 1, with the cab removed to show the relative location of the engine and its associated parts. The outline of the cab and fenders is shown in dotted lines.
Figure 5:
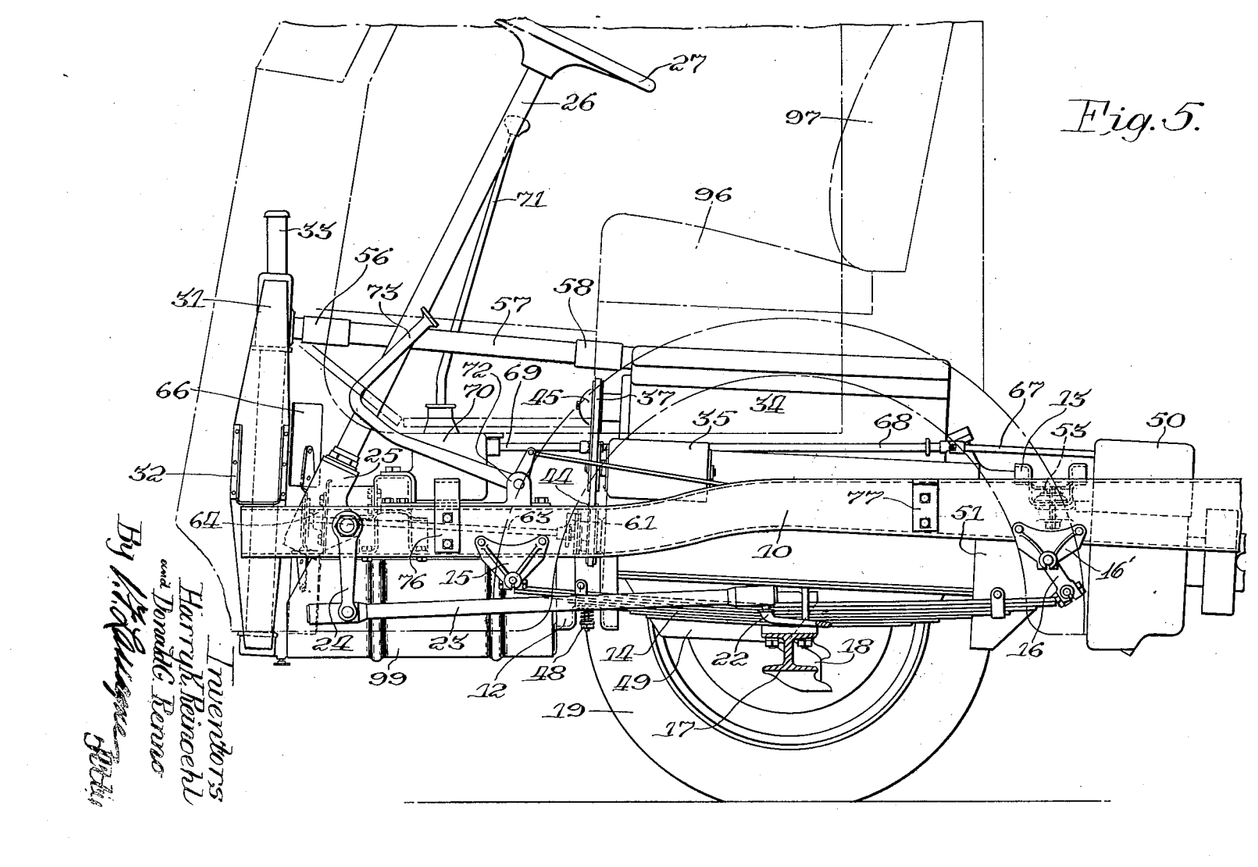
Figure 5 is a side elevation of the chassis shown in Figure 4 with one wheel removed by a section through the axle.

As best shown in Figure 5, the front springs 14 are connected at their forward ends to brackets 15 secured to the side frame members 10. At their rear ends the springs are secured by shackles 16 to brackets 16' rigidly mounted on the side frame members 10. It will be noted that the forward ends of the side frame members are dropped downwardly. This construction is utilized to provide for satisfactory mounting of the engine and its associated parts and the cab in as low a position as practicable on the chassis. The springs 14 are secured by conventional U-bolts to a front axle 17. Said axle is provided with spring pads on which the springs are mounted. It is conventional in construction except for a rearwardly bent portion 18, as best shown in Figure 4. This portion is so formed to provide clearance for the engine oil sump, which will be described in connection with the engine.

Front wheels 19 are mounted on the axle 17, being provided with steering arms 20 connected by a drag-link 21. The left steering arm 20 is provided with an extension 22, which is connected by a steering link 23 with a steering arm 24. Said arm 24 is constructed to be oscillated by a conventional steering mechanism 25. Said mechanism is rigidly secured to the frame of the vehicle in a conventional manner. A steering column 26 extends upwardly at a slight angle rearwardly and is provided with a steering wheel 27. By means of the steering arrangement as described, the operator steers the front wheels 19 from the cab by a very simple and compact mechanism.

L-shaped brackets 28 secured to the front ends of the side frame members 10 provide means for attaching a bumper assembly 29. Intermediate brackets 30 are secured to the bumper assembly and to the brackets 28. The bumper assembly is, therefore, independent of the cab construction, which will be hereinafter described.

Figure 7:
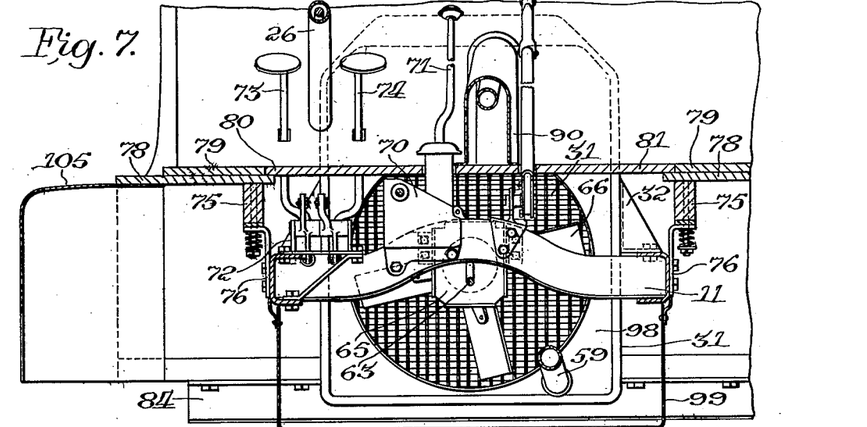
Figure 7 is a vertical transverse section taken on the line 7—7 of Figure 4; and, Figure 8 is a transverse vertical section taken on the line 8—8 of Figure 4.

As shown in Figures 4 and 7, a radiator 31 is mounted at the forward end of the frame, being supported on the side frame members 10 by brackets 32 secured to the radiator casing at the sides thereof. It will be noted that the radiator extends downwardly a substantial distance below the side frame members 10. A filler neck 33 in the upper header of the radiator provides means for adding water to the radiator through an opening formed in the cab front, as will be hereinafter described.

Figure 8:
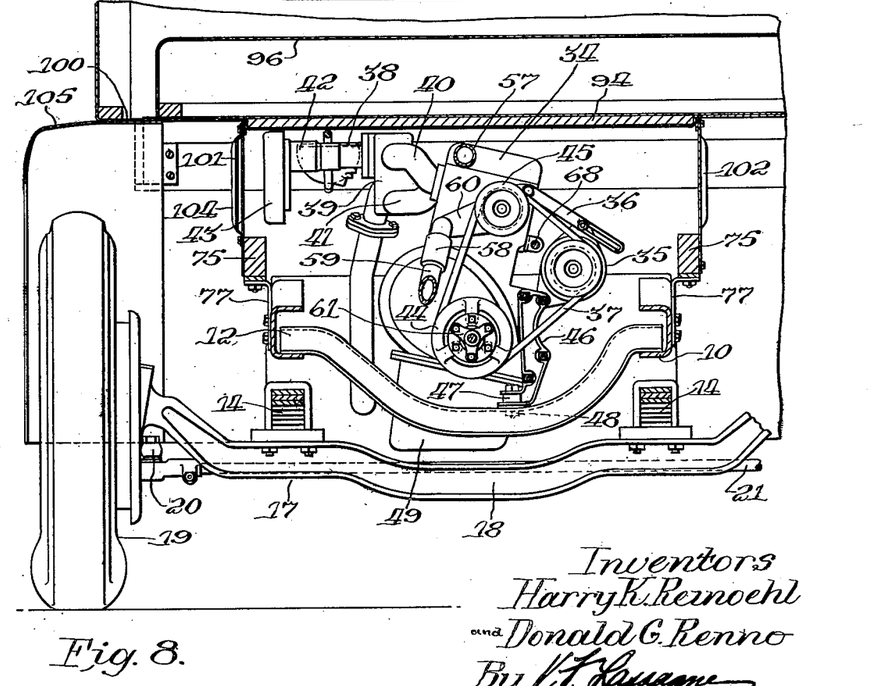

The engine 34 illustrated is a six cylinder L-head engine. It is desirable to use an L-head engine, as the overall height of this type is much less than that of the overhead valve type used to a great extent on commercial vehicles. As best shown in Figure 8, the engine is tilted to one side at an angle of approximately 15 degrees. This position of the engine is used to provide better accessibility and to give sufficient room for the engine accessories.

As best shown in Figures 4 and 8, a generator 35 is pivotally mounted at one side of the engine, being adjustably supported by a slotted bracket 36 for adjusting tension on the driving belt 37. The generator is at the side of the engine, which is tilted away from vertical. As there are no other accessories at this side, space is not needed to give access to the engine. A carburetor 38 is mounted at the other side of the engine directly attached to the manifold assembly 39, which includes an intake manifold 40 and an exhaust manifold 41. As the valves are at this side of the engine, the tilted portion of the engine gives better access to the valves for inspection, adjustment and repair. An intake pipe 42, connected with the carburetor, extends laterally to an air cleaner 43. Said cleaner lies in a position longitudinally of the frame adjacent the fender compartment, which will be hereinafter described.

A drive pulley 44 is mounted on an extension of the engine crank shaft. Said pulley drives the belt 37, which, in addition to driving the generator 35, engages a pulley 45, which drives the water circulating pump. It will be understood that many of these conventional parts have not been shown in detail, as they form a part of the present invention only as a general part of the novel combinations.

At the front end of the engine a mounting bracket 46 is rigidly secured thereto. Said bracket supports the generator 35 previously described. A forward extension 47 of said bracket is provided with a vertical bore through which a bolt 48 extends for securing the bracket to the cross frame member 12. Said member is bent downwardly to provide a support for the engine with the engine located in as low a position as possible to provide the necessary road clearance.

The engine is provided with an oil sump 49, which has a horizontal bottom determining the minimum road clearance of the engine. Said sump is located forwardly of its conventional position on engines of this type to clear the front axle 17. By locating the sump in this forward position and by providing the rearwardly bent portion 18 on the front axle, the engine may be located substantially directly over the axle.

Figure 6:
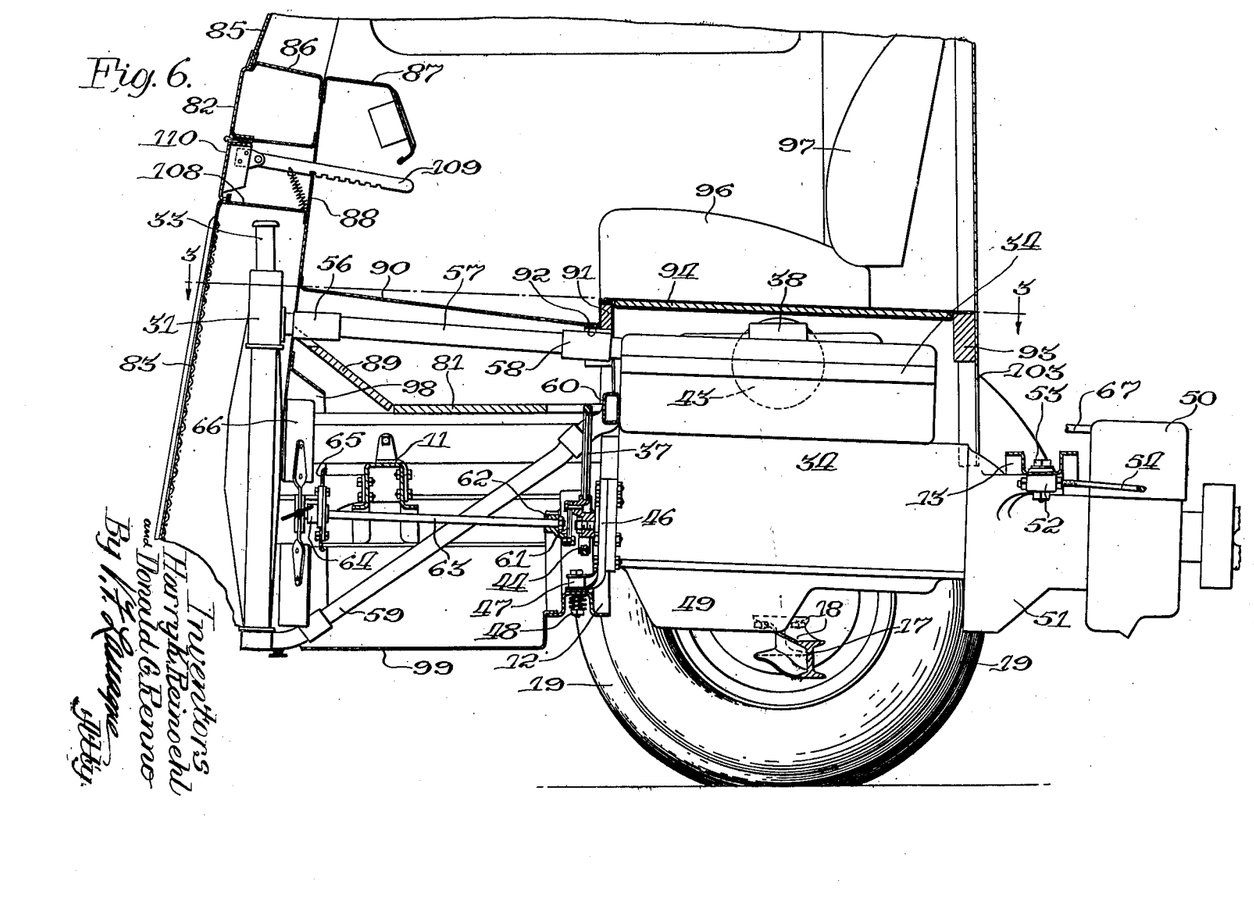
Figure 6 is substantially a vertical section taken through the center line of the truck with the engine and accessories shown in elevation.

The engine assembly, as shown, is of the unit type; that is, the engine is rigidly secured to a transmission casing 50, the clutch and flywheel being located in the housing 51 extending from the engine to the transmission casing. The housing 51 is provided with lateral extensions 52, as best shown in Figures 4 and 6, to provide rear engine supports. Vertical bolts 53 extend through the cross frame member 13 and through the lateral extensions 52 to support the rear of the engine assembly at two points. These supports incorporate rubber mountings as well as the front support above described. As such rubber mountings are conventional in the prior art, they have not been described in detail. It will be understood that the engine assembly is supported by what is termed a three-point mounting, one of the points being at the front substantially centrally of the assembly, and the other two points being at the rear spaced a substantial distance laterally of each other to give a stable mounting. As rubber mountings have a substantial resiliency in all directions, stabilizing rods 54 are utilized to hold the engine against fore and aft movement. Said rods extend through the extensions 52, being secured thereto, and rearwardly and laterally outwardly into contact with the side frame members 10, where they are secured by bolts 55.

The upper end of the radiator 31 is connected by a hose 56 to an outlet pipe 57, which extends rearwardly at a slight angle downwardly. Said pipe is connected by a flexible hose 58 with the outlet from the engine head. To supply water from the radiator to the engine, a pipe 59 is connected by a flexible hose with an outlet from the bottom of the radiator and with an inlet to the water pump 60. This completes the water circulation system for the motor.

The fan pulley 44 is connected by a flexible coupling 61 with a coupling member 62 rigidly mounted on a fan driving shaft 63. Said shaft extends forwardly in axial alignment with the crank shaft of the engine and is journaled in a member 64 carried by a bracket 65. Said bracket is rigidly secured to the front cross frame member 11, as best shown in Figure 6. A fan 66 is mounted on the shaft 63 immediately back of the core of the radiator 31.

For shifting gears in the transmission casing 50, a shifter rod 67, connected to be moved fore and aft for shifting gears and to be rotated for engaging different shifter shafts, is connected by a shaft 68 and suitable universal joints with a shaft 69 mounted for reciprocation and angular movement in a gear shift casing 70 rigidly mounted on the forward cross member 11. A gear shift lever 71 is mounted in a conventional position and is operable by suitable mechanism, not shown in detail, to oscillate and reciprocate the shaft 69 for selectively engaging the different gears of the change speed transmission.

As best shown in Figure 7, a bracket 72 is rigidly mounted on the front cross member 11 for supporting a clutch pedal 73 and a brake pedal 74. Said pedals are provided with lever arms for connection with links, which operate respectively the clutch and the brakes. These parts have not been shown in detail as they are conventional in construction and form no part of the present invention.

The cab, which is a unit entirely independent of the chassis, the engine and the controls and accessories, is formed as a composite structure with a wood frame and sheet metal covering therefor. Two main side sills 75 of the cab extend longitudinally of the frame offset to one side thereof. As best shown in Figure 7, these sills are mounted at one location on brackets 76 secured to the sides of the main frame members 10. The sills are resiliently secured to the brackets to provide for slight flexing of the frame without distorting the cab. The brackets 76 extend above the frame to take care of the forward drop previously described, as shown in Figure 5.

At the rear, the cab is supported on brackets 77 rigidly secured to side frame members. By means of these two sets of brackets, the cab is supported on the frame, the weight resting entirely upon the side sills 75, which are built into the frame structure of the cab.

The complete details of structure of the cab have not been shown. Those parts associated with the floor boards and the seat box have been shown to illustrate the construction of these elements. As best shown in Figure 7, cross members 78 overlie the side sills 75 extending inwardly beyond the sills. A second set of boards 79 lies above the members 78, terminating spaced from the inner edges thereof, to form ledges for mounting the floor boards 80 and 81.

The front 82 of the cab, which is formed of sheet metal, is provided with a central opening over the radiator over which a grid 83 is mounted. At the bottom of the grid a deflector 84 is positioned connected to the cab for deflecting rocks and stones which might injure the lower radiator header.

Figure 1:
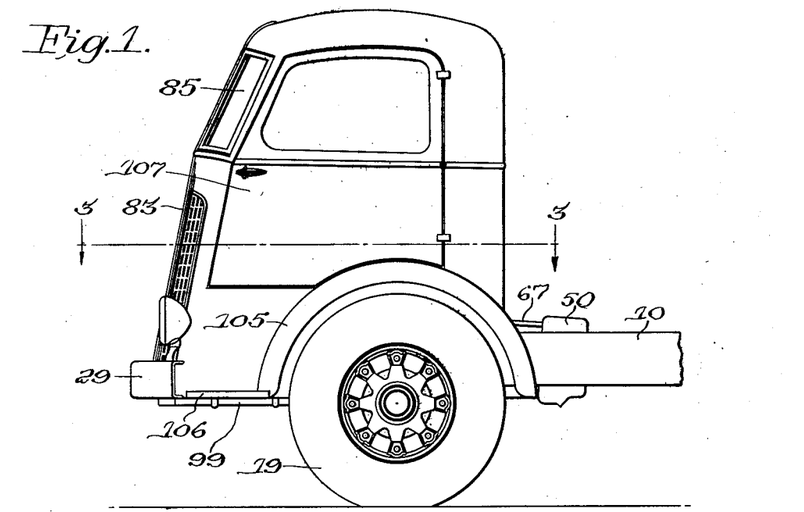
Figure 1 is a side elevation, showing the forward end of a truck embodying the invention.
Figure 2:
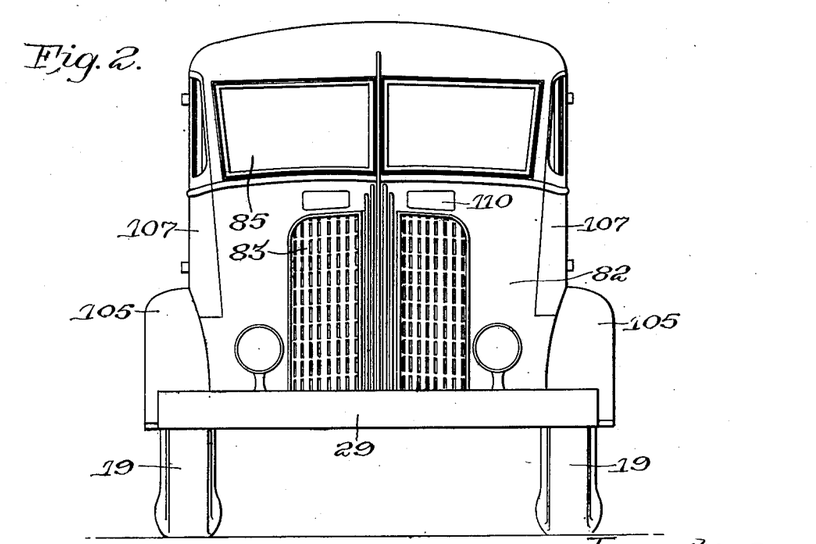
Figure 2 is a front elevation of the same construction shown in Figures 1 and 6.
Figure 3:
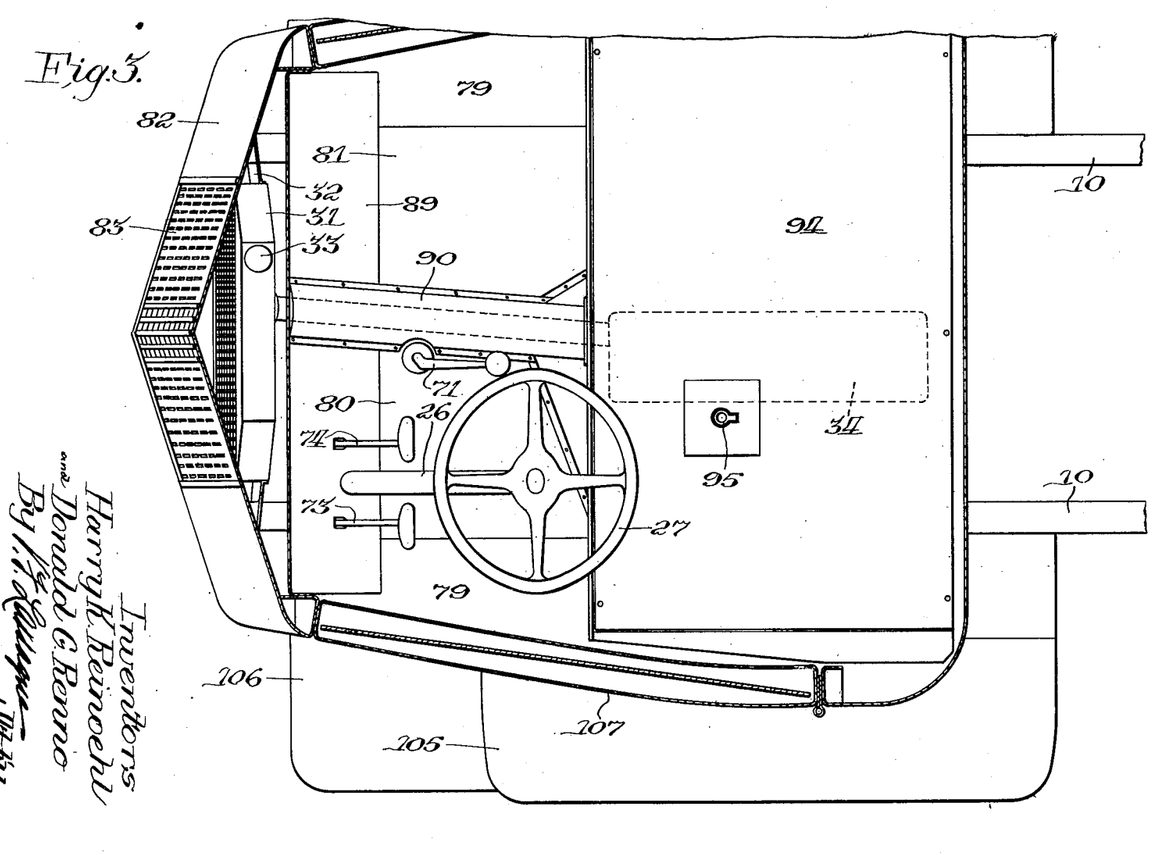
Figure 3 is a horizontal section taken on the line 3—3 of Figure 1.

A V wind-shield 85 is provided in two separate sections. As shown in Figure 6, below the windshield a sheet metal portion 86 extends rearwardly on the inner side to connect with an instrument panel 87, which carries the instruments, such as the speedometer and controls for the electrical equipment. A partition 88 extends downwardly spaced from the front wall of the cab rearwardly of the radiator. Said member terminates above the fan and adjacent a slanting foot board 89. Said foot board, as shown in Figure 3, is in two sections, being divided by a tunnel 90, which extends upwardly from the floor of the cab over the water outlet conduit 57. Said tunnel is of sheet metal, being secured to rigid portions of the cab floor and to the partition 88 at its forward end.

At the rear of the floor boards 80 and 81, a seat riser 91 is formed of two sheet metal members separated by insulating material. Said riser is provided with a central opening through which the water outlet pipe 57 extends. The outside sheet of metal is provided with a supporting flange 92 for the tunnel 90. The upper edge of the seat riser 91 and a cross member 93 at the back of the cab form supports for a removable engine cover and seat support 94. Said cover may be secured by any means by which it may be easily removed for access to the engine. A small removable cover 95 is shown in the cover 94 for easy access to the engine for minor adjustments. The bottom cushion 96 is mounted on the cover 94. The back cushion 97 is supported against the back of the cab.

The direction of air through the radiator and out of the engine compartment is an important feature of the present invention. A shroud 98, carried by the radiator casing, surrounds the fan to obtain a direct air flow through the radiator core. The slanting foot board 89 directs the air stream downwardly under the floor boards 80 and 81. A dust-pan and shield 99 are secured to the bottom edges of the forward ends of the frame members 10. Said pan extends rearwardly in a line substantially on the bottom edge of the radiator. Air from the fan is directed rearwardly between the pan 99 and the floor boards.

At each side the cab is provided with built-in recesses or housings for the front wheels. Said housings are substantially semicylindrical in shape, extending inwardly to the side sills 75. As shown in Figure 8, the housings are formed by sheet metal portions 100 extending over the top of the housings and vertical panels 101 secured to the side sills 75 and, at their upper edges, to turned down portions of the sheet metal housing portions 100. Said shields lie immediately inwardly of the front wheels. Each panel is provided with a plurality of vertical louvers 102 opening rearwardly to allow the escape of air from the engine compartment. For further ventilating the engine compartment, the rear of the cab is formed with an opening 103, shown in Figure 6, which extends upwardly to a height almost up to the engine cover.

It will be noted in Figure 8 that the air cleaner 43 lies adjacent the vertical plate 101. To provide access to the cleaner for removing it, a small panel 104 is constructed to be removed from the plate whereby the air cleaner may be moved laterally and removed from the carburetor.

The fenders 105 for the front wheels are formed to fit internally in the housing portions 100, being secured in position therein in overlapped relation to the sheet metal. At their forward ends the fenders 105 are secured to short foot boards 106, which provide steps for access to the cab. Doors 107 are hinged at the rear to facilitate entrance of the operator from the forward end of the truck by way of the platform or foot boards 106.

To provide ventilation for the cab in addition to the wind-shield, which is preferably adjustable, a ventilator duct 108 is shown as extending from the forward wall of the cab through the partition 88. An adjusting lever 109 is connected to a cover 110 for regulating the air flow through the duct 108.

In the drawings made to illustrate the present invention, the disclosure has been simplified by omitting many details of construction which are not a part of the invention. All of the basic elements forming a part of the invention have been shown either in detail or by outline.

It is believed the operation of the truck and the new features involved therein will be apparent from the above description. The engine mounting, its location with respect to the radiator, and the fan location and driving arrangement are important features of the invention. By arranging the radiator spaced forwardly from the engine, room is provided for constructing a foot compartment for the driver. By carrying the air from the fan over the engine and through the outlet louvers at the sides thereof under the fenders, as well as through the opening at the rear of the engine, an effective air circulation has been obtained. By means of this effective circulation, a reasonable amount of insulation is sufficient to insure comfort in the driver's compartment.

By locating the engine as illustrated and by forming the axle and oil sump as disclosed, the engine may be located substantially over the forward axle. This is an ideal location in trucks, as any location further forward would tend to unbalance the truck when empty and to extend the length of the truck an undesirably long distance behind the front wheels. Any location of the engine back of the axle reduces the pay-load and lengthens the wheel base of the truck.

By using an L-head engine, the driver's seat can be mounted sufficiently low to obtain a very low over-all height for the cab. This has not been possible with cab-over-engine designs of the prior art. The arrangement shown gives a very simple arrangement for the steering and the brake, clutch and transmission controls. The water circulation is as effective as in any commercial construction, as it differs therefrom only in a lengthening of the inlet and outlet pipes to the radiator. The tunnel over the outlet pipe does not interfere with the operator and yet provides for direct flow from the top of the cylinder head to the top of the radiator.

Reasons have been set forth pointing out the inherent advantages of the construction as shown in the drawings and as described in detail. It is to be understood that applicants claim as their invention all modifications and variations of truck design falling within the scope of the appended claims.

What is claimed is:

1. In an automotive vehicle having a frame extending a substantial distance forwardly beyond the front axle, and in combination, a cab mounted on the front end of the frame, an engine mounted on the frame at the rear of the cab projecting upwardly into the cab centrally thereof and occupying substantially half of the cab in the longitudinal direction, a transverse driver's seat mounted at the back of the cab over said engine, a radiator mounted at the front of the cab centrally thereof, a fan adjacent the radiator at the rear thereof with its axis in alignment with the axis of the engine's crankshaft, a driving shaft extending from the crankshaft to the fan, a substantially horizontal floor board ahead of the operator's seat between the engine and its radiator, and a floor board and air deflector extending downwardly to the rear from the top of the radiator and joining the first named floor board.

2. In an automotive vehicle having a frame extending a substantial distance forwardly beyond the front axle, and in combination therewith, a cab mounted on the front end of the frame, an engine mounted on the frame at the rear of the cab projecting upwardly into the cab centrally thereof and occupying substantially half of the cab in the longitudinal direction, a transverse driver's seat mounted at the back of the cab over said engine, a radiator mounted at the front of the cab centrally thereof, a cooling water conduit connecting the top of the radiator with the top of the engine, a narrow shield around said conduit, a fan adjacent the radiator at the rear thereof with its axis in alignment with the axis of the engine's crankshaft, a driving shaft extending from the crankshaft to the fan, a substantially horizontal floor board ahead of the operator's seat between the engine and its radiator, a riser extending from said floor board to the seat, and a floor board and deflector extending downwardly to the rear from the top of the radiator and joining the first named floor board.

3. In an automotive vehicle having a frame extending a substantial distance forwardly beyond the front axle, and in combination therewith, a cab mounted on the front end of the frame, an engine mounted on the frame at the rear of the cab projecting upwardly into the cab centrally thereof and occupying substantially half of the cab in the longitudinal direction, a transverse driver's seat mounted at the back of the cab over said engine, a radiator mounted at the front of the cab centrally thereof, a fan adjacent the radiator at the rear thereof with its axis in alignment with the axis of the engine's crankshaft, a driving shaft extending from the crankshaft to the fan, a substantially horizontal floor board ahead of the operator's seat between the engine and its radiator, a riser extending upwardly from the floor board to the seat, a floor board extending downwardly to the rear from the radiator and joining the first named floor board, and wheel housings at the lower side portions of the cab, said housings being formed with louvers for the outward flow of cooling air.

4. In an automotive vehicle having a frame extending a substantial distance forwardly beyond the front axle, and in combination therewith, a cab mounted on the forward end of the frame, said cab extending rearwardly beyond the front axle, an engine mounted longitudinally of the frame, said engine occupying the rear portion of the cab, a horizontal wall forming the top of the engine compartment and a support for a driver's seat, a vertical riser extending from said wall downwardly to form the front of the engine compartment, a horizontally extending floor board extending forwardly from the lower end of said riser, a slanting floor board extending upwardly from the forward end of the first named floor board, a radiator carried by the frame between the front wall of the cab and the slanting floor board, said front wall being formed as a grill for the entrance of air, a fan mounted at the rear of said radiator in axial alignment with the crankshaft of the engine and connected thereto, and a wall connecting the top of the slanting floor board with the front wall of the cab to provide a radiator compartment, said cab being provided with a back wall formed with an opening at the rear of the engine to facilitate the circulation of air driven through the engine compartment by the fan.

5. In an automotive vehicle having a frame extending a substantial distance forwardly beyond the front axle, and in combination therewith, a cab mounted on the forward end of the frame, said cab extending rearwardly beyond the front axle, wheel housings formed in the sides of said cab, the vertical portions of said housings forming the sides of an engine compartment and being provided with louvers for the escape of air from said compartment, an engine mounted longitudinally of the frame, said engine occupying the rear portion of the cab, an insulated horizontal wall forming the top of the engine compartment and a support for the driver's seat, a vertical riser extending from said wall downwardly to form the front of the engine compartment, a horizontally extending floor board extending forwardly from the lower end of said riser, a slanting floor board extending upwardly from the forward end of the first named floor board, a radiator carried by the frame between the front wall of the cab and the slanting floor board, said front wall being formed as a grill for the entrance of air, a fan mounted at the rear of said radiator, said cab being provided with a back wall formed with an opening at the rear of the engine to facilitate the circulation of air driven through the engine compartment by the fan.

6. In an automotive vehicle having a frame extending a substantial distance forwardly beyond the front axle, and in combination therewith, a cab mounted on the forward end of the frame, said cab extending rearwardly beyond the front axle, wheel housings formed in the sides of said cab, the vertical portions of said housings forming the sides of an engine compartment and being provided with louvers for the escape of air from said compartment, an engine mounted longitudinally of the frame, said engine occupying the rear portion of the cab, an insulated horizontal wall forming the top of the engine compartment and a support for a driver's seat, a vertical riser extending from said wall downwardly to form the front of the engine compartment, a horizontally extending floor board extending forwardly from the lower end of said riser, a slanting floor board extending upwardly from the forward end of the first named floor board, a radiator carried by the frame between the front wall of the cab and the slanting floor board, said front wall being formed as a grill for the entrance of air, a fan mounted at the rear of said radiator in axial alignment with the crankshaft of the engine and connected thereto, and a wall connecting the top of the slanting floor board with the front wall of the cab to provide a radiator compartment, said cab being provided with a back wall formed with an opening at the rear of the engine to facilitate the circulation of air driven through the engine compartment by the fan.

7. In an automotive vehicle, and in combination, a cab mounted at the forward end of the vehicle, a transverse seat at the rear of the cab, a riser at the front of the seat to form an enclosed compartment, an engine mounted under the seat, a radiator at the front of the cab, a fan adjacent the radiator at the rear thereof, means for driving the fan from the engine, a substantially horizontal floor board extending forwardly from the seat riser, an upwardly slanting floor board extending from the forward edge of the first named floor board to the top of the radiator forming thereby an air deflector, an air directing pan secured at the bottom of the cab and extending rearwardly from the bottom of the radiator to the engine compartment, and wheel housings forming the sides of the engine compartment, said housings being formed with louvers for the escape of cooling air from the engine compartment.

8. In an automotive vehicle having a frame, and in combination, a cab mounted at the forward end of the frame, a transverse seat at the rear of the cab, an engine mounted on the frame under the seat, a radiator mounted on the frame at the front of the cab, said radiator extending a substantial distance below the frame, a fan adjacent the radiator at the rear thereof, means for driving the fan from the engine, a substantially horizontal floor board forwardly of the driver's seat, an upwardly slanting floor board extending from the forward edge of the first named floor board to the top of the radiator forming thereby an air deflector, and an air directing pan secured to the forward end of the frame extending downwardly therefrom and rearwardly from the bottom of the radiator, said pan forming together with the floor boards a substantially confined air passage-way from the radiator to the engine compartment, the cab being formed with an opening for outward flow of air from the engine compartment.

9. In an automotive vehicle having a frame, and in combination, a cab mounted at the forward end of the frame, a transverse seat at the rear of the cab, an engine mounted on the frame under the seat, a radiator mounted on the frame at the front of the cab, said radiator extending a substantial distance below the frame, a fan adjacent the radiator at the rear thereof, means for driving the fan from the engine, a substantially horizontal floor board forwardly of the driver's seat, an upwardly slanting floor board extending from the forward edge of the first named floor board to the top of the radiator forming thereby an air deflector, an air directing pan secured to the forward end of the frame extending downwardly therefrom and rearwardly from the bottom of the radiator to the engine, and wheel housings formed in the cab adjacent the engine compartment, said housings being provided with louvers for the escape of heated air.

10. In an automotive vehicle having a frame, and in combination, a cab mounted at the forward end of the frame, a transverse seat at the rear of the cab, an engine mounted on the frame under the seat, a radiator mounted on the frame at the front of the cab, said radiator extending a substantial distance below the frame, a fan adjacent the radiator at the rear thereof with its axis in alignment with the axis of the engine crank-shaft, a drive shaft extending from the crank-shaft to the fan, a substantially horizontal floor board forwardly of the driver's seat, an upwardly slanting floor board extending from the forward edge of the first named floor board to the top of the radiator forming thereby an air deflector, and an air directing pan secured to the forward end of the frame extending downwardly therefrom and rearwardly from the bottom of the radiator to the engine, the cab being formed with an opening for outward flow of air from the engine compartment.

HARRY K. REINOEHL.
DONALD G. RENNO.